US012578740B2

(12) United States Patent
Babtain et al.

(10) Patent No.: US 12,578,740 B2
(45) Date of Patent: Mar. 17, 2026

(54) SYSTEMS AND PROCESSES OF ELIMINATING START-UP FLARING IN A GAS PLANT

(71) Applicant: Saudi Arabian Oil Company, Dhahran (SA)

(72) Inventors: Khalid Saeed Babtain, Al-Hofuf (SA); Abdulhakeem Yahya Alqahtani, Al-Hofuf (SA)

(73) Assignee: Saudi Arabian Oil Company, Dhahran (SA)

( * ) Notice: Subject to any disclaimer, the term of this patent is extended or adjusted under 35 U.S.C. 154(b) by 310 days.

(21) Appl. No.: 18/362,191

(22) Filed: Jul. 31, 2023

(65) Prior Publication Data

US 2025/0044815 A1      Feb. 6, 2025

(51) Int. Cl.
G05D 7/06          (2006.01)
B01D 53/14        (2006.01)
(Continued)

(52) U.S. Cl.
CPC ....... G05D 7/0652 (2013.01); B01D 53/1468 (2013.01); B01D 53/1475 (2013.01); B01D 53/263 (2013.01); C10L 3/103 (2013.01); C10L 3/104 (2013.01); C10L 3/106 (2013.01); F23G 7/08 (2013.01); F23N 5/242 (2013.01); B01D 2252/2023 (2013.01); B01D 2252/204 (2013.01); B01D 2257/304 (2013.01); B01D 2257/308 (2013.01); B01D 2257/502 (2013.01);
(Continued)

(58) Field of Classification Search
CPC .............. G05D 7/0652; B01D 53/1468; B01D 53/1475; B01D 53/263

USPC ....................................................... 431/6, 202
See application file for complete search history.

(56) References Cited

U.S. PATENT DOCUMENTS 4,961,703 A * 10/1990 Morgan .................. F23G 7/085
137/98
9,163,564 B2 * 10/2015 Hottovy .................... F22B 1/18
(Continued)

OTHER PUBLICATIONS

Asl, et al., "Investigation on Zero Flaring during a Gas Refinery Start up: Case Study in the South Pars Gas Complex", IGRC2014_programme_A4_web.pdf, 2014.
(Continued)

*Primary Examiner* — Vivek K Shirsat
(74) *Attorney, Agent, or Firm* — DINSMORE & SHOHL LLP

(57)          ABSTRACT

A system for eliminating start-up flaring in a gas plant utilizing flare stack diversion logic comprises a natural gas source; a start-up train flow-path; a running train flow-path; a bypass flow-path; and a flare stack diversion controller, wherein the flare stack diversion controller is programmed to execute flare stack diversion logic comprising: detecting one or more natural gas feed parameters during start-up, receiving the one or more natural gas feed parameters, determining whether the one or more natural gas feed parameters fall outside pre-defined bounds, generating an alert or message to close the block valve, determining whether the block valve has been opened, closing a start-up train flow valve upon determining the block valve has been opened, and diverting all flow from the running train flow-path to the start-up train flow-path to eliminate start-up flaring of the natural gas feed.

20 Claims, 4 Drawing Sheets

(51) Int. Cl.

| | |
|---|---|
| B01D 53/26 | (2006.01) |
| C10L 3/10 | (2006.01) |
| F23G 7/08 | (2006.01) |
| F23N 5/24 | (2006.01) |

(52) U.S. Cl.

CPC .... *B01D 2257/504* (2013.01); *B01D 2257/80* (2013.01); *C10L 2290/08* (2013.01); *C10L 2290/541* (2013.01); *C10L 2290/58* (2013.01); *F23N 2225/04* (2020.01); *F23N 2225/20* (2020.01); *F23N 2225/26* (2020.01); *F23N 2235/18* (2020.01); *F23N 2239/04* (2020.01)

(56) References Cited

U.S. PATENT DOCUMENTS

| | | | | |
|---|---|---|---|---|
| 12,397,259 | B2 * | 8/2025 | Strand ............... | B01D 53/1475 |
| 2011/0064622 | A1 * | 3/2011 | Garney ................. | C10G 45/58 |
| | | | | 422/187 |

| | | | | |
|---|---|---|---|---|
| 2014/0275693 | A1 * | 9/2014 | Zink ...................... | B01D 53/18 |
| | | | | 422/255 |
| 2019/0022580 | A1 * | 1/2019 | Al Muhsen ........ | B01D 53/1406 |
| 2019/0314755 | A1 * | 10/2019 | Al Muhsen ........ | B01D 53/1406 |
| 2021/0116075 | A1 * | 4/2021 | Lauvdal ............. | E21B 41/0007 |
| 2022/0357034 | A1 * | 11/2022 | Salu ........................ | F23G 7/085 |

OTHER PUBLICATIONS

Hajilary et al., "CO2 emission reduction by zero flaring startup in gas refinery", Materials Science for Energy Technologies, vol. 3, pp. 218-224, 2020.

* cited by examiner

SYSTEMS AND PROCESSES OF ELIMINATING START-UP FLARING IN A GAS PLANT

TECHNICAL FIELD

Embodiments herein generally relate to systems and processes for minimizing flaring, and particularly to systems and processes for eliminating start-up flaring in a gas plant utilizing flare stack diversion logic.

BACKGROUND

One of the major source of carbon emissions worldwide comes from gas plants in the form of gas flaring. In 2021, approximately 144 billion cubic meters of gas was flared, resulting in over 400 million tons of $CO_2$ emissions globally. With ongoing concerns regarding global climate change, innovative solutions are required to reduce the presence and/or amount of flaring in gas plants in general. Moreover, the Zero Routine Flaring Initiative (ZRF Initiative), launched in 2015, has committed various governments and oil companies to end routine flaring of natural gas by 2030.

SUMMARY

Within natural gas plants a significant amount of the total flared gas occurs during start-up or shutdown of gas plant operation. In start-up, significant variations in process parameters can occur, resulting in raw natural gas that does not meet the specification requirements (off-spec) for sale and distribution. Accordingly, the off-spec gases are ordinarily burned in a flare stack until the effluent settles within the desired specification (on-spec).

Desired then are processes and systems that utilize the off-spec gases such that they need not be flared during start-up, which ideally would also result in saleable hydrocarbons and gas. Consequently, described herein are systems and processes for eliminating start-up flaring in a gas plant utilizing flare stack diversion logic. Particularly, a flare stack diversion controller can sense when a gas feed becomes off-spec during start-up, such as when one or more gas feed parameters fall outside pre-defined bounds. The flare stack diversion controller can then divert the flow through one or more flow valves from the start-up train (where it would ordinarily be flared) through a bypass flow-path to a running train. In doing so, off-spec natural gas may be additionally treated within the running train until the natural gas feed is observed to settle within on-spec conditions. At this time, the flare stack diversion logic can reverse the flow valves to allow production of gas effluent for sale and distribution.

In accordance with one embodiment herein, a system for eliminating start-up flaring in a gas plant utilizing flare stack diversion logic, the system comprising: a natural gas source configured to supply a natural gas feed to a running train and a start-up train, the start-up train and the running train each comprising a natural gas treatment unit, the start-up train natural gas treatment unit and the running-train natural gas treatment unit operating with identical parameters; a start-up train flow-path comprising the start-up train fluidly connected to and downstream from the natural gas source, a start-up train flow valve fluidly connected and downstream from the start-up train, a start-up train flow valve actuator coupled to the start-up train flow valve, and a natural gas parameter sensor downstream of the start-up train and upstream of the start-up train flow valve; a running train flow-path comprising a running train shutoff valve fluidly connected to and downstream from the natural gas source, a running train shutoff valve actuator coupled to the running train shutoff valve, and the running train fluidly connected to and downstream from the first running train shutoff valve; a bypass flow-path comprising a block valve and a check valve, the block valve fluidly connecting the outlet of the start-up train to an inlet of the running train, the bypass flow-path interposed between the start-up train outlet and the start-up train flow valve, as well as the running train shutoff valve and the running train inlet, and the check valve interposed between the block valve and the inlet of the running train; a flare stack diversion controller communicatively coupled to the start-up train flow valve actuator, the running train shutoff valve actuator, and the natural gas feed parameter sensor, wherein the flare stack diversion controller is configured to actuate the running train shutoff valve actuator to selectively open or close the running train shutoff valve and is programmed to execute flare stack diversion logic.

Wherein, in the previous embodiment, the flare stack diversion logic comprises detecting one or more natural gas feed parameters from the natural gas feed parameter sensor during start-up, receiving the one or more natural gas feed parameters from the natural gas feed parameter sensor, determining whether the one or more natural gas feed parameters fall outside pre-defined bounds of the natural gas feed parameters, generating an alert or message to open the block valve within the bypass flow-path upon determining the one or more natural gas feed parameters fall outside the pre-defined bounds, determining whether the block valve has been opened, closing the start-up train flow valve upon determining the block valve has been opened, closing the running train shutoff valve, and diverting all flow from the running train flow-path to the start-up train flow-path through the block valve and to the running train to eliminate start-up flaring of the natural gas feed.

In accordance with another embodiment herein, a process for eliminating start-up flaring in a gas plant utilizing flare stack diversion logic comprises: detecting one or more natural gas feed parameters from the natural gas feed parameter sensor during start-up, receiving the one or more natural gas feed parameters from the natural gas feed parameter sensor, determining whether the one or more natural gas feed parameters fall outside pre-defined bounds of the natural gas feed parameters, generating an alert or message to open the block valve upon determining the one or more natural gas feed parameters fall outside the pre-defined bounds, determining whether the block valve has been opened, closing the start-up train flow valve upon determining the block valve has been opened, closing the running train shutoff valve, and diverting all flow from the running train flow-path to the start-up train flow-path through the block valve and to the running train to eliminate start-up flaring.

Wherein, in the previous embodiment a natural gas source is configured to supply a natural gas feed to a running train and a start-up train, the start-up train and the running train both comprising one or more natural gas treatment units operating with identical parameters; a start-up train flow-path comprises the start-up train fluidly connected to and downstream from the natural gas source, a start-up train flow valve fluidly connected and downstream from the start-up train, a start-up train flow valve actuator coupled to the start-up train flow valve, and a natural gas feed parameter sensor downstream of the start-up train and upstream of the start-up train flow valve; a running train flow-path comprises a running train shutoff valve fluidly connected to and downstream from the natural gas source, a running train shutoff valve actuator coupled to the running train shutoff valve, and the running train fluidly connected to and downstream from the running train shutoff valve; a bypass flow-path comprising a block valve and a check valve, the block valve fluidly connecting the outlet of the start-up train to an inlet of the running train, the bypass flow-path interposed between the start-up train outlet and the start-up train flow valve, as well as the running train shutoff valve and the running train inlet, and the check valve interposed between the block valve and the inlet of the running train; and a flare stack diversion controller is communicatively coupled to the start-up train flow valve actuator, the running train shutoff valve actuator, and the natural gas feed parameter sensor, wherein the flare stack diversion controller is configured to actuate the running train shutoff valve actuator to selectively open or close the running train shutoff valve and is programmed to execute a process utilizing flare stack diversion logic.

In accordance with yet another embodiment herein, a system for eliminating start-up flaring in a gas plant utilizing flare stack diversion logic comprises: a first natural gas source configured to supply a natural gas feed to a start-up train; a second natural gas source configured to supply the natural gas feed to a running train, the start-up train and the running train each comprising a natural gas treatment unit, the start-up train natural gas treatment unit and the running-train natural gas treatment unit operating with identical parameters; a start-up train flow path comprising the start-up train fluidly connected to and downstream from the first natural gas source, a start-up train flow valve fluidly connected and downstream from the start-up train, a start-up train flow valve actuator coupled to the start-up train flow valve, and a natural gas parameter sensor downstream of the start-up train and upstream of the start-up train flow valve; a running train flow-path having a relatively lesser fluid pressure than the start-up train flow-path and comprising the running train fluidly connected to and downstream from the second natural gas source; a bypass flow-path comprising a bypass flow valve and a check valve, the control valve fluidly connecting the outlet of the start-up train to an inlet of the running train, the bypass flow-path interposed between the start-up train outlet and the start-up train flow valve, as well as the second natural gas source and the running train inlet, and the check valve interposed between the control valve and the inlet of the running train; the flare stack diversion controller is communicatively coupled to the start-up train flow valve actuator and the natural gas feed parameter sensor, wherein the flare stack diversion controller is configured to actuate the start-up train flow valve actuator and the bypass flow valve actuator to selectively open or close the start-up train flow valve and the bypass flow valve, respectively, the flare stack diversion controller also programmed to execute flare stack diversion logic.

Wherein, in the previous embodiment, the flare stack diversion logic comprises detecting one or more natural gas feed parameters from the natural gas feed parameter sensor during start-up, receiving the one or more natural gas feed parameters from the natural gas feed parameter sensor, determining whether the one or more natural gas feed parameters fall outside pre-defined bounds of the natural gas feed parameters, closing the start-up train flow valve upon determining the one or more natural gas feed parameters fall outside the pre-defined bounds, and opening the bypass flow valve within the bypass flow-path to eliminate start-up flaring of the natural gas feed.

BRIEF DESCRIPTION OF THE SEVERAL VIEWS OF THE DRAWINGS

The following detailed description of specific embodiments herein can be best understood when read in conjunction with the following drawings, where like structure is indicated with like reference numerals and in which.

DETAILED DESCRIPTION

Embodiments herein generally relate to systems and processes for minimizing flaring, and particularly to systems and processes for eliminating start-up flaring in a gas plant utilizing flare stack diversion logic.

Figure 1:
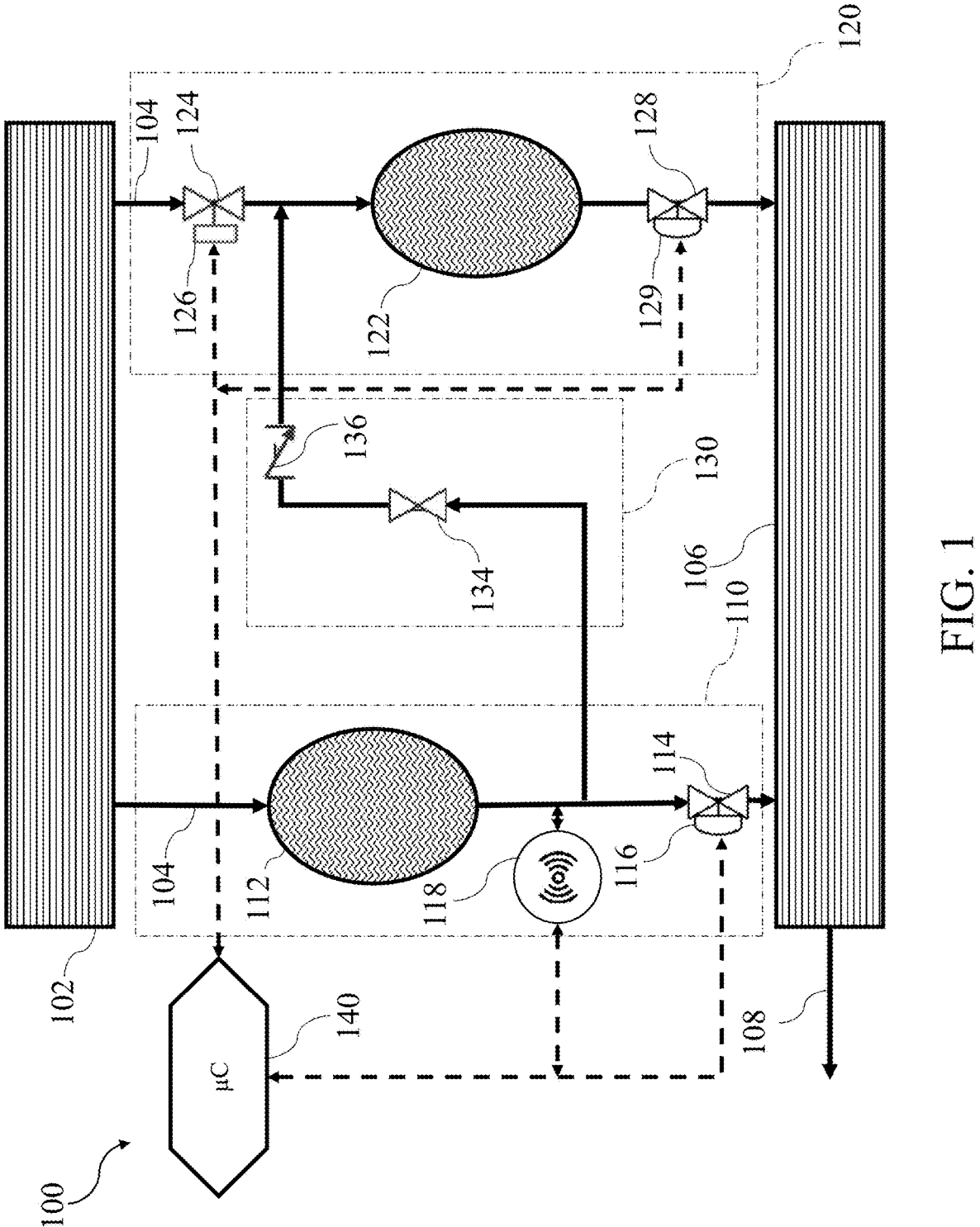
FIG. 1 illustrates a system for eliminating start-up flaring in a gas plant utilizing flare stack diversion logic with a single natural gas source according to embodiments herein.

Referring initially to FIG. 1, a system 100 for eliminating flaring in a gas plant is illustrated. The system 100 comprises a natural gas fluid source 102, a start-up train flow-path 110, a running train flow-path 120, a bypass flow-path 130, and a flare stack diversion controller 140. The natural gas source 102, which may also be regarded as a common header, may be configured to supply a natural gas feed 104 to a start-up train 112 and a running train 122. The start-up train 112 and the running train 122 may each be configured to supply the natural gas feed 104 to an outlet header 106.

The start-up train flow-path 110 may comprise the start-up train 112, a start-up train flow valve 114, a start-up train flow valve actuator 116, and a natural gas feed parameter sensor 118. The running train flow-path 120 may comprise the running train 122, a running train shutoff valve 124, and a running train shutoff valve actuator 126. The bypass flow-path 130 may comprise a block valve 134, and may or may not comprise a check valve 136. Although not illustrated, the running train fluid flow-path may also comprise a second check interposed between the natural gas source 102 and either the running train shutoff valve 124 or the intersection of the bypass flow-path 130 and the running train flow-path 120. The running train fluid flow-path may further comprise a running train flow valve 128, along with an associated running train flow valve actuator 129. The running train flow valve 128 may be configured to regulate supply of the natural gas feed 104 to the outlet header 106. The flare stack diversion controller 140 may be programmed to execute flare stack diversion logic on the other components of the system 100 during start-up operations, as described in further detail below.

As previously stated, the start-up train flow-path 110 may comprise the start-up train 112. The start-up train 112 may be fluidly connected to and downstream from the natural gas source 102. The start-up train flow valve 114 may be fluidly connected to and downstream from the start-up train 112. The start-up train flow valve 114 may also be regarded as a flow control valve, and may be a rotary valve, a linear valve, a self-actuated valve, or any other flow control valve recognized in the art. The start-up train flow valve 114 may also be interposed between the start-up train 112 and the outlet header 106.

In embodiments, the start-up train flow valve actuator 116 may be coupled to the start-up train flow valve 114, and may be configured to variably open or close the start-up train flow valve 114. The start-up train flow valve actuator 116 may comprise an actuator communication and receiver component. The actuator communication and receiver component, such as a wired or wireless connection, may be operable to communicate with a microcontroller, such as the flare stack diversion controller 140, to instruct the start-up train flow valve actuator 116 to variably open or close, i.e. actuate, the start-up train flow valve 114, as described in further detail below.

The natural gas feed parameter sensor 118 may be downstream of the start-up train 112 and upstream of the start-up train flow valve 114. The natural gas feed parameter sensor 118 may be configured to detect one or more natural gas feed parameters from the natural gas feed 104 exiting an outlet side of the start-up train 112, such that the natural gas feed parameter sensor 118 may also be regarded as a train analyzer 118. In embodiments, the one or more natural gas feed parameters may comprise a flow rate, a pressure, a temperature, a water content, an acid gas content, a sour gas content, a dew point of the natural gas feed, a natural gas feed composition, or combinations thereof. Similarly, the natural gas feed parameter sensor 118 may comprise a moisture analyzer, a carbon dioxide sensor, a carbon monoxide sensor, a hydrogen disulfide sensor, a flowmeter, a temperature probe, a pressure sensor, compositional analyzer or combinations thereof, which may be operable to sense the aforementioned parameters.

The natural gas feed parameter sensor 118 may further comprise a sensor communication component. The communication component, such as a wired or wireless connection, may be operable to communicate the detected natural gas feed parameters from the sensor to a microcontroller, such as the flare stack diversion controller as described in further detail below.

Still referring to FIG. 1, and as previously stated, the running train flow-path 120 may comprise the running train 122, the running train shutoff valve 124, and the running train shutoff valve actuator 126. As previously stated, the running train flow-path 120 may also comprise the running train flow valve 128 and the running train flow valve actuator 129. Similar to the start-up train 112, the running train 122 may be fluidly connected to and downstream from the natural gas source 102. However, the running train 122 may also be parallel to the start-up train 112. Moreover, the running train shutoff valve 124 may be interposed between the running train 122 and the natural gas source 102, fluidly connected to and downstream from the natural gas source 102, and fluidly connected to and upstream from the running train 122. The running train shutoff valve actuator 126 may be coupled to the running train shutoff valve 124. The running train shutoff valve 124 may be a stop valve, a gate valve, a ball valve, a lube valve, butterfly valve, globe valve, zone valve, motor operated valve (MOV), or any other shutoff valve recognized in the art.

The running train flow valve 128 and the running train flow valve actuator 129 may be similar to or identical to the start-up train flow valve 114 and the start-up train flow valve actuator 116, respectively. Particularly, the running train flow valve 128 may be fluidly connected to and downstream from the running train 122. The running train flow valve actuator 129 may also be coupled to the running train flow valve 128, and may be configured to variably open or close the running train flow valve 128 to regulate flow out of the running train 122.

Still referring to FIG. 1 and the running train flow-path 120, the running train 122 and the running train flow valve 128 may both be upstream of the outlet header 106. Accordingly, the start-up train 112 and the running train 122 may both be configured to supply the natural gas feed 104 to the outlet header 106, which in turn may be configured to supply a natural gas effluent 108 to a further downstream location, such as for sale, distribution, or further refining.

As previously stated, the start-up train 112 and the running train 122 may both be downstream from the natural gas source 102 and parallel to each other. In addition, the start-up train 112 and the running train 122 may both comprise one or more natural gas treatment units. In embodiments, the one or more natural gas treatment units in the start-up train 112 and the one or more natural gas treatment units in the running train 122 may be identical or substantially identical. As used herein, "substantially identical" refers to the start-up train 112 and the running train 122 having the same natural gas treatment units and having operational conditions (pressure, temperature, flow rate, feed to additive ratio, residence time, etc.) with less than or equal to 5% absolute deviation, such as from 0 to 5% absolute deviation, from each other, such that the products exiting the natural gas treatment units are substantially identical (less than or equal to 5% absolute deviation). For example, and in embodiments, if the natural gas treatment unit of the running train 122 has an operating temperature of 100° C., the natural gas treatment unit of the start-up train 112 may be understood to be substantially identical if it has an operating temperature of anywhere from 95° C. to 105° C.

As previously stated, the start-up train 112 and the running train 122 may both comprise natural gas treatment units. The natural gas treatment units may comprise a gas sweetening system, a gas dehydration system, Natural gas liquids (NGL) systems, gas/hydrocarbon stabilization systems or combinations thereof. For example and in embodiments, the gas dehydration system may comprise a glycol absorber column, a flash drum, a stripper column, a reboiler, a condenser, a propane chiller, or combinations thereof. The gas sweetening system may comprise an amine absorber column, a flash drum, a stripper column, a reboiler, a condenser, or combinations thereof, such as in a Girbotol process.

Accordingly, in embodiments, for a gas dehydration system, the one or more natural gas feed parameters detected by the natural gas feed parameter sensor 118 may comprise an $H_2O$ content, and the natural gas feed parameter sensor 118 may comprise a moisture content sensor. Similarly, for a gas sweetening system, the one or more natural gas feed parameters detected by the natural gas feed parameter sensor 118 may comprise an acid gas content, a $H_2S$ 'sour gas' content, a $CO_2$ content, a CO content, or combinations thereof, and the natural gas feed parameter sensor 118 may comprise a an acid gas sensor, a carbon dioxide sensor, a carbon monoxide sensor, a hydrogen disulfide sensor, or combinations thereof. As used herein, acid gas refers to a corrosive subset of gases comprising but not limited to $H_2S$, $CO_2$, CO, carbonyl sulfide (COS), and carbon disulfide ($CS_2$), wherein the presence of the same makes a gas mixture 'sour' and the relative absence thereof makes the gas mixture 'sweet.'

Still referring to FIG. 1, and as previously stated, the system 100 may comprise the bypass flow-path 130, which may comprise the block valve 134. The block valve 134 may fluidly connect an outlet of the start-up train 112 to an inlet of the running train 122. Accordingly, the bypass flow-path 130 may be interposed between the start-up train 112 outlet and the start-up train flow valve 114, as well as the running train shutoff valve 124 and the running train 122 inlet. Moreover, when the block valve 134 is open during the startup to divert off-spec gases, the natural gas feed 104 may exit the outlet of the start-up train 112 and bypass the first valve to instead divert to the inlet of the running train 122. Furthermore, when the check valve 136 is placed downstream of the block valve 134, bypass flow may be unidirectional, such that flow may be diverted from the start-up train flow-path 110 to the running train flow-path 120, but not from the start-up train flow-path 110 to the running train flow-path 120. The block valve 134 may also be configured to ordinarily be closed, such that the bypass flow-path 130 is shut when the start-up train flow valve 114 is open, as explained in further detail below. The block valve 134 may be a manual valve, such that the block valve 134 may need to be opened by an operator in the field, as explained in further detail hereinbelow.

Still referring to FIG. 1, and as previously stated, the system 100 may comprise the flare stack diversion controller 140, which may be programmed to execute flare stack diversion logic. The flare stack diversion controller 140 may be communicatively coupled to the start-up train flow valve actuator 116, the running train shutoff valve actuator 126, the running train flow valve actuator 128, and the natural gas feed parameter sensor 118. For direct communication, it is contemplated that the start-up train flow valve actuator 116, the running train shutoff valve actuator 126, the running train flow valve actuator 128, and the natural gas feed parameter sensor 118 may comprise a two-way data communications link connecting communications hardware of the same to communications hardware of the flare stack diversion controller 140. The flare stack diversion controller 140 may comprise a microcontroller unit, or it may comprise multiple or sub-microcontroller units. The microcontroller unit may comprise a processor communicatively coupled to the memory. The communications hardware of the microcontroller unit may receive data, comprising the one or more natural gas feed parameters, from the natural gas feed parameter sensor 118 and transfer the data to be stored in the memory. The processor may be configured to pull the data from the memory, conduct one or more operations on the data according to the flare stack diversion logic, which may also be stored on the memory, before communicating instructions to the start-up train flow valve actuator 116, the running train shutoff valve actuator 126, or both to selectively open or close the running train shutoff valve 114/124.

In embodiments, flare stack diversion logic may comprise detecting the one or more natural gas feed parameters from the natural gas feed parameter sensor 118, receiving the one or more natural gas feed parameters from the natural gas feed parameter sensor, and determining whether the one or more natural gas feed parameters fall outside pre-defined bounds of the natural gas feed parameters.

The pre-defined bounds may be determined according to the experience of gas plant personnel, by regulations regarding the compositional content or quality of saleable hydrocarbons and natural gas, ratings for components within the system 100, operational safety, or combinations thereof. For example, operational safety may determine that a certain percentage of hydrogen sulfide gas must be removed before sale for safety reasons. Similarly, environmental regulations may determine the quality of saleable hydrocarbons and/or natural gas for 'clean' burning fuels and energy sources.

Referring again to the flare stack diversion logic, the logic may comprise determining whether the one or more natural gas feed parameters fall outside pre-defined bounds of the natural gas feed parameters during the startup. If the natural gas feed parameters fall inside the pre-defined bounds, the remaining steps of the logic are not conducted as the natural gas feed 104 is on-spec. However, if the natural gas feed parameters fall outside the pre-defined bounds, i.e. the natural gas feed 104 is off-spec (as in the majority of start-up cases), an alert or message is generated to open the block valve 134. As previously stated, the block valve 134 may be a manual valve, such that an operator in the field may open the valve. The logic may then comprise a logic permissive step in which it is determined whether the block valve 134 has been opened. Upon determining the block valve has been opened, instructions are sent to the start-up train flow valve actuator 116 to close the start-up train flow valve 114. Without being limited by theory, closing of the start-up train flow valve 114 prior to the opening of the block valve 134 may lead to a pressure surge in the start-up train flow path 110, as the natural gas feed 104 may have no place to go. The opening or closing of the start-up train flow valve 114 may also occur gradually, such that a pressure surge does not occur within the start-up train flow-path 110. The closing of the start-up train flow valve 114 may also operate to divert the natural gas feed 104 from the start-up train flow-path 110 through the bypass flow-path 130 and to the running train flow-path 120.

Still referring to the flare stack diversion logic, after closing the start-up train flow valve 114, additional instructions may be sent to the running train shutoff valve actuator 126 to close the running train shutoff valve 124. Similar to the start-up train flow valve 114, opening or closing of the second may occur gradually, such that a pressure surge does not occur within the running train flow-path 120. Upon complete closure of the running train shutoff valve 124, all flow of the natural gas feed 104 may be diverted through the start-up train flow-path 110, through the bypass flow-path 130, and to the running train 122. In this manner, the running train 122 may operate to further treat the off-spec natural gas feed 104, bringing the same to on-spec conditions until observing the one or more natural gas feed parameters fall inside the pre-defined bounds. This may be particularly advantageous in start-up or shut-down operations of a gas plant, when treatment conditions can vary and thus create natural gas effluents 108 that are not on-spec and suitable for sale and distribution. The same may also operate to eliminate gas flared in the system 100 as ordinarily this off-spec gas is diverted out of the system 100 and sent to a flare stack to be burned. In embodiment including the running train flow valve 128 downstream of the running train 122, additional instructions may be sent to the running train flow valve actuator 129 to variably open or close the running train flow valve 128 to maintain flow rate within the running train flow path 120 within desired bounds. Similar to the pre-defined bounds, the desired bounds of the flow rate may be determined according to the experience of gas plant personnel, by regulations regarding the compositional content or quality of saleable hydrocarbons and natural gas, ratings for components within the system 100, operational safety, or combinations thereof.

Figure 2:
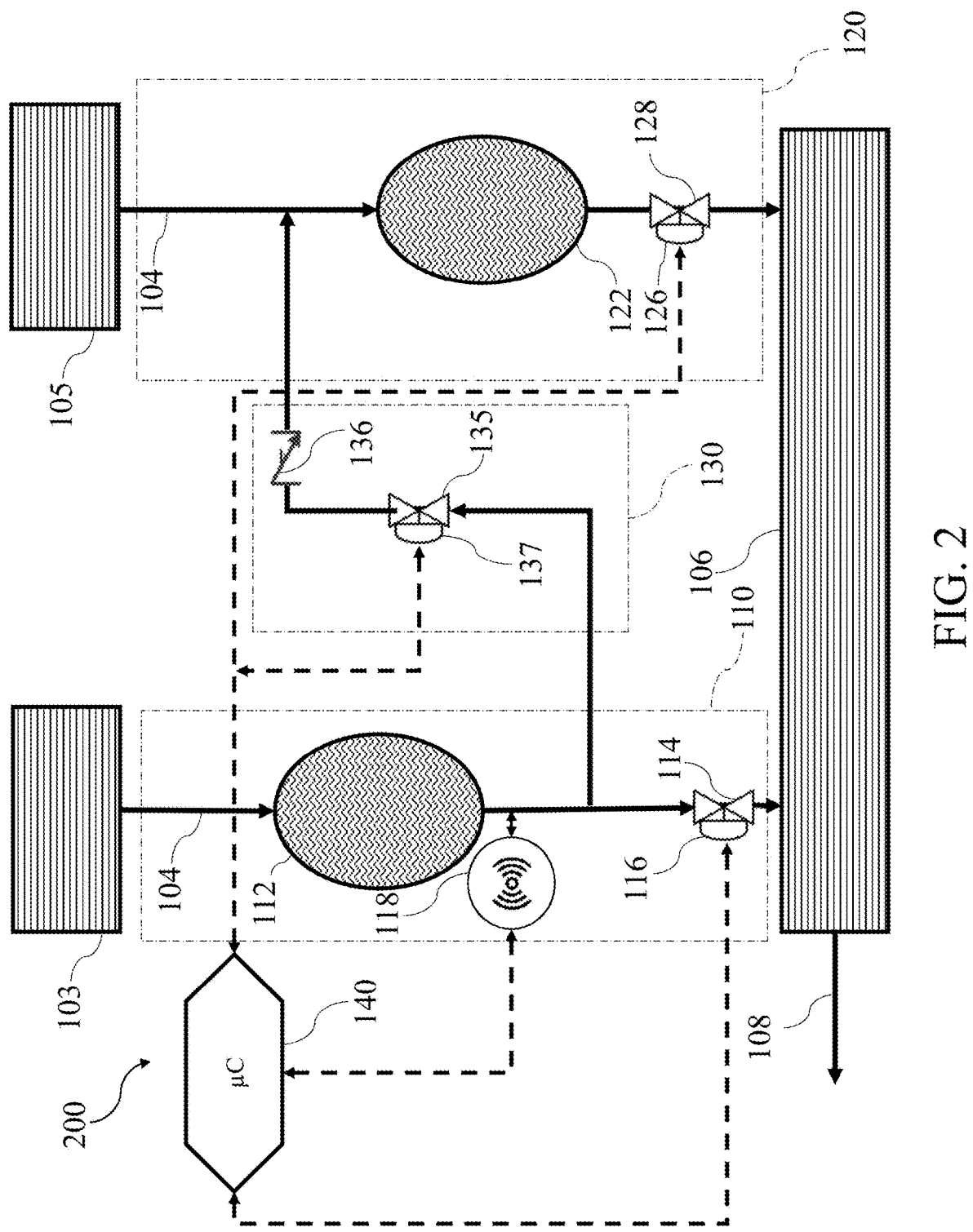
FIG. 2 illustrates a system for eliminating start-up flaring in a gas plant utilizing flare stack diversion logic with at least two natural gas sources according to embodiments herein.

Now referring to FIG. 2, and in embodiments, another system 200 for eliminating start-up flaring in a gas plant utilizing flare stack diversion logic is illustrated. The system 200 may be similar to system 100 in most or all aspects, except that system 200 does not comprise the natural gas source 102, the running train shutoff valve 124, or the running train shutoff valve actuator 126. Instead, the system 200 comprises a first natural gas source 103 and a second natural gas source 105, which may also be regarded as a segregated header. The system 200 also comprises a bypass flow valve 135 and a bypass flow valve actuator 137 instead of the block valve 134. The bypass flow valve 135 and the bypass flow valve actuator 137 may be similar or identical to the start-up train flow valve 114 and the start-up train flow valve actuator 116. Further, the flare stack diversion controller 140 of system 200 is also in communication with the bypass flow valve actuator 137.

The first natural gas source 103 may be fluidly connected to and upstream from the start-up train 112 and configured to supply the natural gas feed 104 to the same. Similarly, the second natural gas source 105 may be fluidly connected to and upstream from the running train 122 and configured to supply the natural gas feed 104 to the running train 122. The running train flow-path 120 also has a relatively lesser fluid pressure of the natural gas feed 104 than the start-up train flow-path 110. The bypass flow-path 130 is also interposed between the second natural gas source 105 and the running train 122 inlet due to the lack of the running train shutoff valve 124.

In embodiments, and similar to system 100, flare stack diversion logic of the flare stack diversion controller 140 of system 200 may comprise detecting the one or more natural gas feed parameters from the natural gas feed parameter sensor 118, receiving the one or more natural gas feed parameters from the natural gas feed parameter sensor 118, and determining whether the one or more natural gas feed parameters fall outside pre-defined bounds of the natural gas feed parameters.

However, flare stack diversion logic of system 200 differs in that if the natural gas feed parameters fall outside the pre-defined bounds during start-up, instructions are sent to the start-up train flow valve actuator 116 to close the start-up train flow valve 114 and variably open the bypass flow-valve 135, but there is also no running train shutoff valve 124 to close. Accordingly, without being limited by any particular theory, the running train flow-path 120 having a relatively lesser fluid pressure enables the relatively greater pressure natural gas feed 104 from the start-up train flow-path 110 through the bypass flow-path 130 to preferentially force past the natural gas feed 104 in the running train flow-path 120. Further, variably opening or closing the bypass flow valve 135 may also control the pressure differential between the start-up and running train flow paths 110/120. The flare stack diversion logic may also include an aspect wherein a set point flow rate may be associated with a degree of opening/closing of the bypass flow valve 135. Accordingly the logic may additionally comprise setting a set-point flow rate for the bypass flow valve 135 by opening or closing the bypass flow valve 135 to a set degree, as would be understood in the art. Accordingly, while not all natural gas feed 104 from the second natural gas source 105 is diverted from the running train flow-path 120, at least a portion of the natural gas feed 104 entering the inlet of the running train 122 will be further treated as having already passed through the start-up train, thereby bringing the natural gas feed 104 exiting the running train 112 to on-spec conditions during the start-up until observing the one or more natural gas feed parameters falling inside the pre-defined bounds.

Still referring to the flare stack diversion logic of system 200, upon determining one or more natural gas feed parameters fall inside the pre-defined bounds, i.e. the natural gas feed 104 is on-spec, instructions may be sent to the start-up train flow valve actuator 116 to open the start-up train flow valve 114 and close the bypass flow valve 135 to close the bypass flow-path 130. Without being limited by theory, the previous additional logic may allow the system to return to the original positioning when treatment conditions level out and additional treatment of the natural gas feed 104 is no longer necessary to ensure the natural gas feed 104 is on-spec for sale and distribution.

Accordingly, the flare stack diversion logic for both systems 100 and 200 may also comprise overrides for emergency situations, including but not limited to high differential pressure situations or blockages in flow. For example and in embodiments, the flare stack diversion logic may override the previous logic and open the start-up train flow valve 114, the running train shutoff valve 124, the bypass flow valve 135, or combinations thereof, upon observing a sudden increase in a differential pressure between a start-up train inlet pressure sensor configured to sense a fluid pressure upstream of the start-up train 112 and a running train outlet pressure sensor configured to sense a fluid pressure downstream of the running train 122, or upon observing a sudden low pressure in the running train outlet pressure sensor. The natural gas feed 104, as the natural gas effluent 108, may then be directed to a flare stack (not illustrated) for emergency flaring until the high differential pressure situation or the blockage (low-pressure situation) is resolved. Similarly, the flare stack diversion logic may override the previous logic and open the start-up train flow valve 114, the running train shutoff valve 124, the bypass flow valve 135, or combinations thereof, upon observing a sudden increase in a differential pressure between the start-up train inlet pressure sensor and the natural gas parameter sensor 118 comprising the pressure sensor configured to sense a fluid pressure downstream of the start-up train 112, or upon observing a sudden low pressure in the natural gas parameter sensor 118 comprising the pressure sensor. The natural gas feed 104, as the natural gas effluent 108, may then be directed to a flare stack (not illustrated) for emergency flaring until the high differential pressure situation or the blockage (low-pressure situation) is resolved Similarly, upon observing a sudden decrease in flow at the natural gas feed parameter sensor after opening of the block valve 134 and the bypass flow valve 135 (wherein the natural gas feed parameter sensor also comprises a flowmeter), the logic may override the previous flare stack diversion logic by opening the start-up train flow valve 114, the running train shutoff valve 124, or both. The natural gas feed 104, as the natural gas effluent 108, may then be directed to a flare stack (not illustrated) for emergency flaring until the overpressure situation or blockage is resolved.

Figure 3:
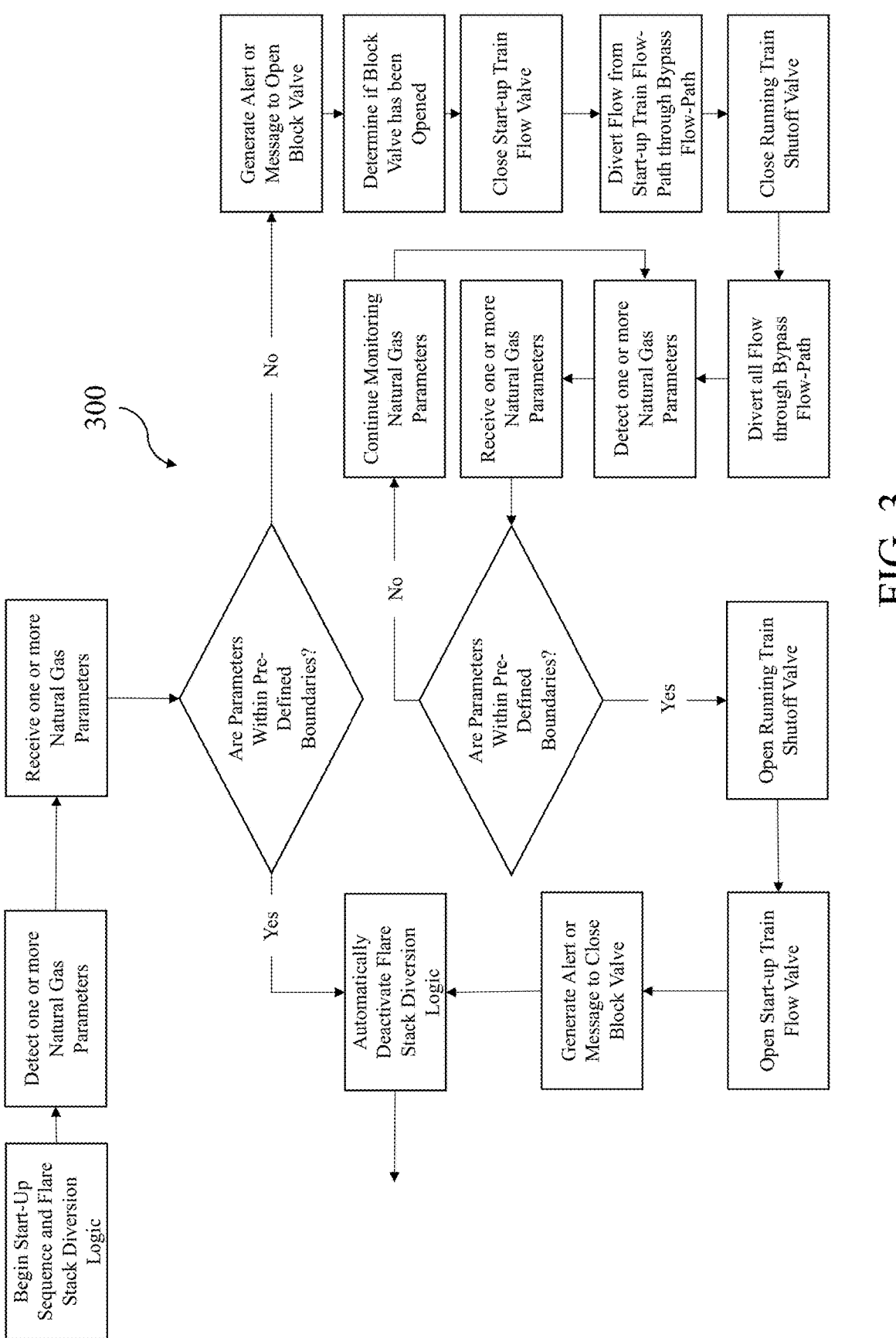
FIG. 3 illustrates a flowchart for flare stack diversion logic with a single natural gas source according to embodiments herein.

Now referring to FIG. 3, and in embodiments, an illustration of a process 300 for eliminating start-up flaring in a gas plant utilizing flare stack diversion logic, the natural gas source 102, the start-up train flow-path 110, the running train flow-path 120, the bypass flow-path 130, and the flare stack diversion controller 140 of system 100 is shown. The process 300 may comprise the initial steps of detecting the one or more natural gas feed parameters from the natural gas feed parameter sensor 118 during start-up, receiving the one or more natural gas feed parameters from the natural gas feed parameter sensor 118, and determining whether the one or more natural gas feed parameters fall outside pre-defined bounds of the natural gas feed parameters.

The process 300 may further comprise, upon determining the one or more natural gas feed parameters fall outside the pre-defined bounds, generating an alert or message to open the block valve 134. The process 300 may then comprise a logic permissive step in which it is determined whether the block valve 134 has been opened. Upon determining the block valve 134 has been opened, the process may further comprise closing the start-up train flow valve 114, diverting flow of the natural gas feed 104 from the start-up train flow-path 110 through the bypass flow-path 130. The process 300 may then comprise closing the running train shutoff valve 124 and diverting all flow from the running train flow-path 120 to the start-up train flow-path 110 through the block valve 134 and bypass flow-path 130 and through the running train 122, the running train flow valve 128, or both, to eliminate flaring.

In embodiments, the process 300 may also comprise, upon determining the one or more natural gas feed parameters fall inside the pre-defined bounds, opening the running train shutoff valve 124. The process may then comprise opening the start-up train flow valve 114 as well as generating an alert or message to close the block valve 134, and thereby the bypass flow-path 130.

In embodiments, the process 300 may also comprise observing a sudden increase in the differential pressure between the start-up train inlet pressure sensor and the running train outlet pressure sensor after opening of the block valve 134 and closing the start-up train flow valve 114, and overriding the previous flare stack diversion logic by opening the start-up train flow valve 114 and the running train shutoff valve 124. Without being limited by theory, overriding the previous flare stack diversion logic in this manner may limit or prevent damage to the system 100 due to overpressure or blockage.

In embodiments, the process 300 may also comprise observing a sudden decrease in flow at the natural gas feed parameter sensor 118 (the natural gas feed parameter sensor 118 comprising a flowmeter) after opening of the block valve 134 and closing the start-up train flow valve 114, and overriding the previous flare stack diversion logic by opening the start-up train flow valve 114 and the running train shutoff valve 124. Without being limited by theory, overriding the previous flare stack diversion logic in this manner may limit or prevent damage to the system 100 due to overpressure or blockage.

Figure 4:
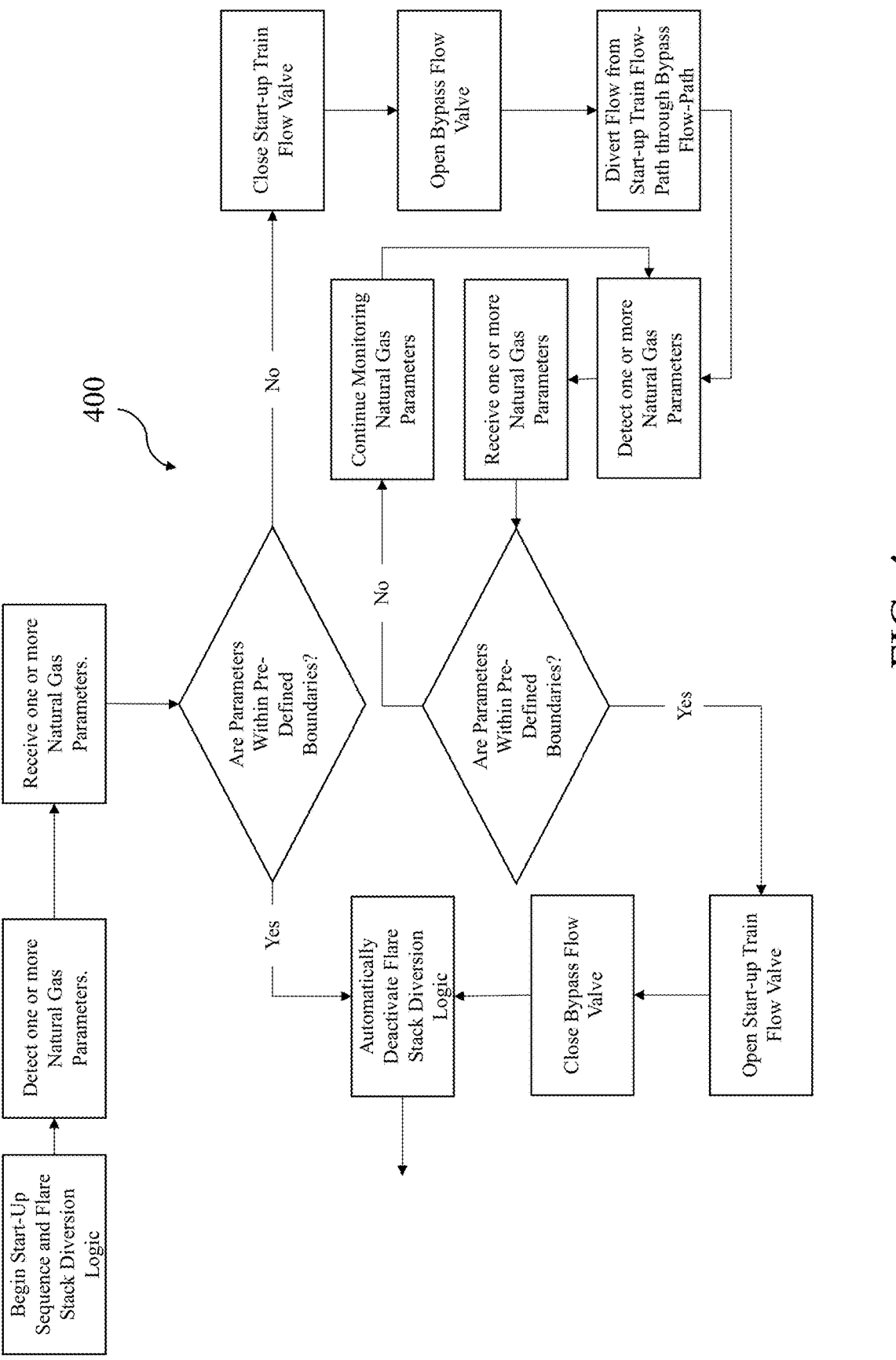
FIG. 4 illustrates a flowchart for flare stack diversion logic with two natural gas sources according to embodiments herein.

Now referring to FIG. 4, and in embodiments, an illustration of a process 400 utilizing system 200 for eliminating start-up flaring in a gas plant utilizing flare stack diversion logic is shown. The system 200 comprises the natural gas source 102, the start-up train flow-path 110, the running train flow-path 120, the bypass flow-path 130, and the flare stack diversion controller 140. The process 400 may comprise the initial steps of detecting the one or more natural gas feed parameters from the natural gas feed parameter sensor 118 during start-up, receiving the one or more natural gas feed parameters from the natural gas feed parameter sensor 118, and determining whether the one or more natural gas feed parameters fall outside pre-defined bounds of the natural gas feed parameters.

The process 400 may further comprise, upon determining the one or more natural gas feed parameters fall outside the pre-defined bounds, closing the start-up train flow valve 114. The process 400 may then comprise opening the bypass flow valve 135 within the bypass flow-path 130 and diverting flow of the natural gas feed 104 from the start-up train flow-path 110 through the bypass flow-path 130 to eliminate flaring. In embodiments, the process 400 may also comprise, upon determining the one or more natural gas feed parameters fall inside the pre-defined bounds, opening the start-up train flow valve 114 and closing the bypass flow valve, thereby closing the bypass flow-path 130.

In embodiments, the process 400 may also comprise observing a sudden increase in the differential pressure between the start-up train inlet pressure sensor and the running train outlet pressure sensor after opening of the running train flow valve 135, and overriding the previous flare stack diversion logic by opening the start-up train flow valve 114 and closing the running train flow valve 135. Without being limited by theory, overriding the previous flare stack diversion logic in this manner may limit or prevent damage to the system 100 due to overpressure or blockage.

In embodiments, the process 400 may also comprise observing a sudden decrease in flow at the natural gas feed parameter sensor 118 (the natural gas feed parameter sensor 118 comprising a flowmeter) after opening of the running train flow valve 135, and overriding the previous flare stack diversion logic by opening the start-up train flow valve 114 and closing the running train flow valve 135. Without being limited by theory, overriding the previous flare stack diversion logic in this manner may limit or prevent damage to the system 100 due to overpressure or blockage.

Having described the subject matter herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope herein, including, but not limited to, embodiments defined in the appended claims. More specifically, although some aspects herein are identified herein as preferred or particularly advantageous, it is contemplated that the present disclosure is not necessarily limited to these aspects.

For the purpose of describing the simplified schematic illustrations and descriptions of the relevant figures, the numerous valves, temperature sensors, micro controllers and the like that may be employed and well known to those of ordinary skill in the art of certain chemical processing operations may or may not be included. It should be understood that these components, when not illustrated, are within the spirit and scope of the present embodiments disclosed. Further, operational components, such as those described in the present disclosure, may be added to the embodiments described in this disclosure.

It should further be noted that arrows in the drawings refer to process streams. However, the arrows may equivalently refer to transfer lines, which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows, which do not connect two or more system components, signify a product stream, which exits the depicted system, or a system inlet stream, which enters the depicted system. Product streams may be further processed in accompanying chemical processing systems or may be commercialized as end products.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

Furthermore, arrows with dashed lines in the drawings may indicate electronic communication between one or more system components, such as wired or wireless communications.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in embodiments, less than all of the stream signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a unit or other system component. For example, it should be understood that when two streams are depicted as being combined directly prior to entering a unit, that in embodiments the streams could equivalently be introduced into the unit or be mixed within the same. Alternatively, when two streams are depicted to independently enter a system component, they may in embodiments be mixed together before entering that system component.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component herein being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A system for eliminating start-up flaring in a gas plant utilizing flare stack diversion logic, the system comprising:
   a natural gas source configured to supply a natural gas feed to a running train and a start-up train, the start-up train and the running train each comprising a natural gas treatment unit, the start-up train natural gas treatment unit and the running-train natural gas treatment unit operating with identical parameters;
   a start-up train flow-path comprising the start-up train fluidly connected to and downstream from the natural gas source, a start-up train flow valve fluidly connected and downstream from the start-up train, a start-up train flow valve actuator coupled to the start-up train flow valve, and a natural gas parameter sensor downstream of the start-up train and upstream of the start-up train flow valve;
   a running train flow-path comprising a running train shutoff valve fluidly connected to and downstream from the natural gas source, a running train shutoff valve actuator coupled to the running train shutoff valve, and the running train fluidly connected to and downstream from the running train shutoff valve;
   a bypass flow-path comprising a block valve and a check valve, the block valve fluidly connecting the outlet of the start-up train to an inlet of the running train, the bypass flow-path interposed between the start-up train outlet and the start-up train flow valve, as well as the running train shutoff valve and the running train inlet, and the check valve interposed between the block valve and the inlet of the running train;
   a flare stack diversion controller communicatively coupled to the start-up train flow valve actuator, the running train shutoff valve actuator, and the natural gas feed parameter sensor, wherein the flare stack diversion controller is configured to actuate the running train shutoff valve actuator to selectively open or close the running train shutoff valve and is programmed to execute flare stack diversion logic comprising:
      detecting one or more natural gas feed parameters from the natural gas feed parameter sensor during start-up,
      receiving the one or more natural gas feed parameters from the natural gas feed parameter sensor,
      determining whether the one or more natural gas feed parameters fall outside pre-defined bounds of the natural gas feed parameters,
      generating an alert or message to open the block valve within the bypass flow-path upon determining the one or more natural gas feed parameters fall outside the pre-defined bounds,
      determining whether the block valve has been opened,
      closing the start-up train flow valve upon determining the block valve has been opened,
      closing the running train shutoff valve, and
      diverting all flow from the running train flow-path to the start-up train flow-path through the block valve and to the running train to eliminate start-up flaring of the natural gas feed.

2. The system of claim 1, wherein flare stack diversion logic further comprises:
   opening the running train shutoff valve upon determining the one or more natural gas feed parameters fall inside the pre-defined bounds;
   opening the start-up train flow valve; and
   generating an alert or message to close the block valve within the bypass flow-path.

3. The system of claim 1, wherein:
   the natural gas parameter sensor comprises a pressure sensor configured to sense a fluid pressure downstream of the start-up train;
   the running train flow-path further comprises a running train outlet pressure sensor configured to sense the fluid pressure downstream of the running train and communicatively coupled to the flare stack diversion processor; and
   flare stack diversion logic further comprises:
      observing an increase in a differential fluid pressure between the natural gas parameter sensor comprising the pressure sensor and the running train outlet pressure sensor after opening of the block valve, and overriding the previous flare stack diversion logic by opening the start-up train flow valve and the running train shutoff valve.

4. The system of claim 1, wherein:

the start-up train flow-path further comprises a start-up train inlet pressure sensor configured to sense a fluid pressure upstream of the start-up train, the start-up train inlet pressure sensor communicatively coupled to the flare stack diversion processor;

the natural gas parameter sensor comprises a pressure sensor configured to sense the fluid pressure downstream of the start-up train; and flare stack diversion logic further comprises:

observing an increase in a differential fluid pressure between the start-up train inlet pressure sensor and the natural gas parameter sensor comprising the pressure sensor after opening of the block valve and the closing of the start-up train flow valve, and overriding the previous flare stack diversion logic by opening the start-up train flow valve and the running train shutoff valve.

5. The system of claim 3, wherein:

the running train flow-path further comprises a running train outlet flowmeter configured to sense a flow rate of the natural gas feed downstream of the running train;

the natural gas feed parameter sensor comprises a flowmeter configured to sense a flow rate of the natural gas feed downstream of the start-up train; and flare stack diversion logic further comprises:

observing a sudden decrease in flow at the natural gas feed parameter sensor after diverting all flow from the running train flow-path, and overriding the previous flare stack diversion logic by opening the start-up train flow valve and the running train shutoff valve.

6. The system of claim 1, wherein:

the natural gas feed parameter sensor comprises a moisture analyzer, a carbon dioxide sensor, a carbon monoxide sensor, a hydrogen disulfide sensor, a flowmeter, a temperature probe, a pressure sensor, a compositional analyzer or combinations thereof; and the one or more natural gas feed parameters comprise a flow rate, a pressure, a temperature, a water content, an acid gas content, a sour gas content, a dew point of the natural gas feed, a natural gas feed composition, or combinations thereof.

7. The system of claim 1, wherein:

the running train flow-path further comprises a running train flow valve fluidly connected to and downstream from the running train and a running train flow valve actuator coupled to the running train flow valve;

the flare stack diversion controller is further communicatively coupled to the running train flow valve actuator; and flare stack diversion logic further comprises diverting all flow from the running train flow-path to the start-up train flow-path through the block valve, to the running train, and through the running train flow valve to eliminate start-up flaring of the natural gas feed.

8. The system of claim 1, wherein the natural gas treatment units of the start-up train and the running train comprise a gas dehydration system, a gas sweetening/treating system, or combinations thereof.

9. The system of claim 8, wherein:

the gas dehydration system comprises a glycol absorber column, a flash drum, a stripper column, a reboiler, a condenser, or combinations thereof; and the gas sweetening system comprises an amine absorber column, a flash drum, a stripper column, a reboiler, a condenser, or combinations thereof.

10. A process for eliminating start-up flaring in a gas plant utilizing flare stack diversion logic, wherein:

a natural gas source is configured to supply a natural gas feed to a running train and a start-up train, the start-up train and the running train both comprising one or more natural gas treatment units operating with identical parameters;

a start-up train flow-path comprises the start-up train fluidly connected to and downstream from the natural gas source, a start-up train flow valve fluidly connected and downstream from the start-up train, a start-up train flow valve actuator coupled to the start-up train flow valve, and a natural gas feed parameter sensor downstream of the start-up train and upstream of the start-up train flow valve;

a running train flow-path comprises a running train shutoff valve fluidly connected to and downstream from the natural gas source, a running train shutoff valve actuator coupled to the running train shutoff valve, and the running train fluidly connected to and downstream from the running train shutoff valve;

a bypass flow-path comprising a block valve and a check valve, the block valve fluidly connecting the outlet of the start-up train to an inlet of the running train, the bypass flow-path interposed between the start-up train outlet and the start-up train flow valve, as well as the running train shutoff valve and the running train inlet, and the check valve interposed between the block valve and the inlet of the running train;

a flare stack diversion controller is communicatively coupled to the start-up train flow valve actuator, the running train shutoff valve actuator, and the natural gas feed parameter sensor, wherein the flare stack diversion controller is configured to actuate the running train shutoff valve actuator to selectively open or close the running train shutoff valve and is programmed to execute a process utilizing flare stack diversion logic; and the process utilizing flare stack diversion logic comprises:

detecting one or more natural gas feed parameters from the natural gas feed parameter sensor during start-up, receiving the one or more natural gas feed parameters from the natural gas feed parameter sensor, determining whether the one or more natural gas feed parameters fall outside pre-defined bounds of the natural gas feed parameters, generating an alert or message to open the block valve upon determining the one or more natural gas feed parameters fall outside the pre-defined bounds, determining whether the block valve has been opened, closing the start-up train flow valve upon determining the block valve has been opened, closing the running train shutoff valve, and diverting all flow from the running train flow-path to the start-up train flow-path through the block valve and to the running train to eliminate start-up flaring.

11. The process of claim 10, further comprising:

opening the running train shutoff valve upon determining the one or more natural gas feed parameters fall inside the pre-defined bounds;

opening the start-up train flow valve; and generating an alert or message to close the block valve within the bypass flow-path.

12. The system of claim 10, wherein:

the natural gas parameter sensor comprises a pressure sensor configured to sense a fluid pressure downstream of the start-up train;

the running train flow-path further comprises a running train outlet pressure sensor configured to sense a fluid pressure downstream of the running train and communicatively coupled to the flare stack diversion processor; and flare stack diversion logic further comprises:

observing an increase in a differential pressure between the pressure sensor and the running train outlet pressure sensor after opening of the block valve and closing of the start-up train flow valve, and overriding the previous flare stack diversion logic by opening the start-up train flow valve and the running train shutoff valve.

13. The process of claim 10, wherein:

the start-up train flow-path further comprises a start-up train inlet pressure sensor configured to sense a fluid pressure upstream of the start-up train and communicatively coupled to the flare stack diversion processor;

the natural gas parameter sensor comprises a pressure sensor configured to sense the fluid pressure downstream of the start-up train; and the process further comprises:

observing an increase in a differential pressure between the start-up train inlet pressure sensor and the natural gas parameter sensor comprising the pressure sensor after opening of the block valve and closing of the start-up train flow valve, and overriding the previous flare stack diversion logic by opening the start-up train flow valve and the running train shutoff valve.

14. The process of claim 10, wherein:

the running train flow-path further comprises a running train outlet flowmeter configured to sense a flow rate of the natural gas feed downstream of the running train and communicatively coupled to the flare stack diversion processor;

the natural gas feed parameter sensor comprises a flowmeter configured to sense a flow rate of the natural gas feed downstream of the start-up train and communicatively coupled to the flare stack diversion processor; and flare stack diversion logic further comprises:

observing a sudden decrease in flow at the natural gas feed parameter sensor after opening of the block valve and closing of the start-up train flow valve, and overriding the previous flare stack diversion logic by opening the start-up train flow valve and the running train shutoff valve.

15. The process of claim 10, wherein:

the one or more natural gas feed parameters comprise a flow rate, a pressure, a temperature, a water content, an acid gas content, a sour gas content, a dew point of the natural gas feed, a natural gas feed composition, or combinations thereof; and the natural gas feed parameter sensor comprises a moisture analyzer, a carbon dioxide sensor, a carbon monoxide sensor, a hydrogen disulfide sensor, a flowmeter, a temperature probe, a pressure sensor, a compositional analyzer or combinations thereof.

16. The process of claim 10, wherein:

the running train flow-path further comprises a running train flow valve fluidly connected to and downstream from the running train and a running train flow valve actuator coupled to the running train flow valve;

the flare stack diversion controller is further communicatively coupled to the running train flow valve actuator; and the process further comprises diverting all flow from the running train flow-path to the start-up train flow-path through the block valve, to the running train, and through the running train flow valve to eliminate start-up flaring of the natural gas feed.

17. The process of claim 10, wherein the natural gas treatment units of the start-up train and the running train comprise a gas dehydration system, a gas sweetening system, or combinations thereof.

18. The process of claim 17, wherein:

the gas dehydration system comprises: a glycol absorber column, a flash drum, a stripper column, a reboiler, a condenser, or combinations thereof; and the gas sweetening system comprises: an amine absorber column, a flash drum, a stripper column, a reboiler, a condenser, or combinations thereof.

19. A system for eliminating start-up flaring in a gas plant utilizing flare stack diversion logic, the system comprising:

a first natural gas source configured to supply a natural gas feed to a start-up train;

a second natural gas source configured to supply the natural gas feed to a running train, the start-up train and the running train each comprising a natural gas treatment unit, the start-up train natural gas treatment unit and the running-train natural gas treatment unit operating with identical parameters;

a start-up train flow path comprising the start-up train fluidly connected to and downstream from the first natural gas source, a start-up train flow valve fluidly connected and downstream from the start-up train, a start-up train flow valve actuator coupled to the start-up train flow valve, and a natural gas parameter sensor downstream of the start-up train and upstream of the start-up train flow valve;

a running train flow-path having a relatively lesser fluid pressure than the start-up train flow-path and comprising the running train fluidly connected to and downstream from the second natural gas source;

a bypass flow-path comprising a bypass flow valve and a check valve, the control valve fluidly connecting the outlet of the start-up train to an inlet of the running train, the bypass flow- path interposed between the start-up train outlet and the start-up train flow valve, as well as the second natural gas source and the running train inlet, and the check valve interposed between the control valve and the inlet of the running train;

the flare stack diversion controller is communicatively coupled to the start-up train flow valve actuator and the natural gas feed parameter sensor, wherein the flare stack diversion controller is configured to actuate the start-up train flow valve actuator and the bypass flow valve actuator to selectively open or close the start-up train flow valve and the bypass flow valve, respectively, the flare stack diversion controller also programmed to execute flare stack diversion logic, comprising:

detecting one or more natural gas feed parameters from the natural gas feed parameter sensor during start-up, receiving one or more natural gas feed parameters from the natural gas feed parameter sensor, determining whether the one or more natural gas feed parameters fall outside pre-defined bounds of the natural gas feed parameters, closing the start-up train flow valve upon determining the one or more natural gas feed parameters fall outside the pre-defined bounds, and opening the bypass flow valve within the bypass flow-path to eliminate start-up flaring of the natural gas feed.

20. The system of claim 19, wherein flare stack diversion logic further comprises:

opening the start-up train flow valve upon determining the one or more natural gas feed parameters fall inside the pre-defined bounds; and closing the bypass flow valve within the bypass flow-path.

\* \* \* \* \*